United States Patent
Iwasaki et al.

(10) Patent No.: US 9,740,427 B2
(45) Date of Patent: Aug. 22, 2017

(54) COPYING DATA IN VIRTUAL SEQUENTIAL ACCESS VOLUMES

(71) Applicant: International Business Machines Corporation, Armonk, NY (US)

(72) Inventors: Norie Iwasaki, Fujisawa (JP); Katsuyoshi Katori, Kawasaki (JP); Koichi Masuda, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 14/819,497

(22) Filed: Aug. 6, 2015

(65) Prior Publication Data

US 2016/0041780 A1 Feb. 11, 2016

(30) Foreign Application Priority Data

Aug. 11, 2014 (JP) .................................. 2014-163514

(51) Int. Cl.
*G06F 12/00* (2006.01)
*G06F 3/06* (2006.01)
(Continued)

(52) U.S. Cl.
CPC .............. *G06F 3/065* (2013.01); *G06F 3/061* (2013.01); *G06F 3/0686* (2013.01); *G06F 11/10* (2013.01); *G06F 12/0253* (2013.01)

(58) Field of Classification Search
CPC ........ G06F 3/067; G06F 3/065; G06F 3/0647; G06F 12/0253
See application file for complete search history.

(56) References Cited

U.S. PATENT DOCUMENTS

2003/0182350 A1* 9/2003 Dewey .................. G06F 3/0601
718/100
2008/0250197 A1* 10/2008 Daily ................. G11B 20/1201
711/111
(Continued)

FOREIGN PATENT DOCUMENTS

JP 07084728 A 3/1995
JP 09101912 A 4/1997
(Continued)

OTHER PUBLICATIONS

"Method and System for Copying Data in Virtual Sequential Access Volume", Japan Patent Application No. 2014-163514, English Translation, filed on Aug. 11, 2014, pp. 1-30.

*Primary Examiner* — Ryan Bertram
*Assistant Examiner* — Trang Ta
(74) *Attorney, Agent, or Firm* — Gregory Nordstrom

(57) ABSTRACT

In one embodiment, a method is provided for copying data in a virtual sequential access volume (VSAV) among at least two computers. The method of the present invention includes the operations of: writing first data in a first VSAV, into a first storage device of a first computer; updating version information on the first VSAV, and storing the updated version information and information on a write start position of the first data, into the first storage device; transmitting the information on the write start position of the first data to a second computer; writing the first data into a second storage device of the second computer, from the write start position of the first data; and updating version information on the first VSAV, and storing the updated version information and the received information on the write start position of the first data, into the second storage device.

17 Claims, 4 Drawing Sheets

(51) Int. Cl.
*G06F 11/10* (2006.01)
*G06F 12/02* (2006.01)

(56) References Cited

U.S. PATENT DOCUMENTS

| | | | |
|---|---|---|---|
| 2011/0040942 A1* | 2/2011 | Akirav | G06F 17/30575 711/159 |
| 2012/0047392 A1* | 2/2012 | Akirav | G06F 11/2094 714/3 |

FOREIGN PATENT DOCUMENTS

| | | | |
|---|---|---|---|
| JP | 11015604 | A | 1/1999 |
| JP | 2002091807 | A | 3/2002 |
| JP | 2002182988 | A | 6/2002 |
| JP | 2004164318 | A | 6/2004 |
| JP | 2005202915 | A | 7/2005 |
| JP | 2005275582 | A | 10/2005 |
| JP | 2008090868 | A | 4/2008 |
| JP | 2011054153 | A | 3/2011 |
| JP | 2012503240 | A | 2/2012 |
| WO | 2011018338 | A1 | 2/2011 |

* cited by examiner

COPYING DATA IN VIRTUAL SEQUENTIAL ACCESS VOLUMES

TECHNICAL FIELD

The present invention relates to copying data in a virtual sequential access volume, and more specifically to sequentially copying data in a virtual tape volume among at least two computers.

BACKGROUND OF THE INVENTION

Some techniques have been developed for storing data (file) as a virtual tape volume in a hard disk drive (hereinafter referred to as "HDD") that is a random access device, on the assumption of data storage into a sequential access device, such as a tape drive. For example, one system virtualizes a random accessible file system (e.g., a disk cache, an HDD) to cause a host to recognize the system as a tape drive that performs sequential access. Moreover, one virtual tape volume is managed as one file on a GPFS (General Parallel File System). Accordingly, in principle, such a system uses the virtual tape volume file in a sequential manner.

One technique maintains data multiplicity by building a Grid distributed system (hereinafter abbreviated as "Grid") to copy (replicate) the virtual tape volume file among multiple clusters (nodes). Moreover, a copy function itself can be implemented to be able to accommodate a distributed environment. Specifically, each cluster requiring copy (copy target cluster) dynamically selects an optimal copy source cluster at an optimal timing, and then an actual copy is executed.

In this copy of the data in the virtual tape volume among the clusters, if the virtual tape volume has been changed (updated), it is conceivable to copy only a changed portion (difference) in order to reduce an amount of data flowing on a network among the cluster.

For example, in one system, positions of Truncate and Erase recently applied on a source cluster are recorded in something called "RST table," and compared to the RST table as previously replicated on a target cluster, and thereby a data difference to be copied (a most recent position of data) is detected.

In another system, in a storage apparatus, a master disk controller overwrites update data stored in a second area of a cache memory so as to be transferred to a sub disk controller, with update data of the same records, for a prescribed time between first and second preset base points, and the sub disk controller handles the update data between the first and second base points as consistent actual data.

SUMMARY

In an aspect of the present invention, a method for copying data in a virtual sequential access volume is provided, the method comprising: a first computer writing first data in a first virtual sequential access volume received from a host, into a first virtual sequential access volume stored in a first storage device; the first computer updating version information on the first virtual sequential access volume stored in the first storage device, and storing the updated version information and information on a write start position of the first data, into the first storage device; a second computer receiving the write start position of the first data from the host; the second computer writing the first data into a first virtual sequential access volume stored in a second storage device, from the write start position of the first data; and the second computer updating version information on the first virtual sequential access volume stored in the second storage device, and storing the updated version information and the information on the write start position of the first data, into the second storage device.

According to another aspect of the present invention, a system for copying data in a virtual sequential access volume is provided, the system comprising: a host; and a group of at least two computers communicably connecting to the host, the computers each including a storage device and being mutually communicable, wherein a first computer of the group includes program instructions to: write first data in a first virtual sequential access volume received from the host, into a first virtual sequential access volume stored in a first storage device; and update version information on the first virtual sequential access volume stored in the first storage device, and store the updated version information and information on a write start position of the first data, into the first storage device; wherein a second computer of the group includes program instructions to: receive the write start position of the first data from the host; write the first data into a first virtual sequential access volume stored in a second storage device, from the write start position of the first data; and update version information on the first virtual sequential access volume stored in the second storage device, and store the updated version information and the information on the write start position of the first data, into the second storage device.

According to another aspect of the present invention, a computer program product for copying data in a virtual sequential access volume is provided, the computer program product comprising: one or more computer readable storage media and program instructions stored on the one or more computer readable storage media, the program instructions comprising: program instructions to write first data in a first virtual sequential access volume received from a host, into a first virtual sequential access volume stored in a first storage device; program instructions update version information on the first virtual sequential access volume stored in the first storage device, and store the updated version information and information on a write start position of the first data, into the first storage device; program instructions to receive the write start position of the first data from the host; program instructions to write the first data into a first virtual sequential access volume stored in a second storage device, from the write start position of the first data; and program instructions to update version information on the first virtual sequential access volume stored in the second storage device, and store the updated version information and the information on the write start position of the first data, into the second storage device.

DETAILED DESCRIPTION

Embodiments of the present invention recognize that, in certain existing techniques for storing data as a virtual tape volume in a random access device, if a file copy has failed halfway, the copy must be performed again from the beginning. In other words, the copy may not be performed continuously from a successfully copied portion.

An object of the present invention is to solve or reduce the above described problems and to provide a solution for sequentially, easily and quickly copying data in a virtual sequential access volume in a random access device, such as an HDD, on the assumption of a sequential access device, such as a tape drive. Furthermore, another object of the present invention is to provide a solution for enabling the copy to be performed continuously from a successfully copied portion, without performing the copy again from the beginning even if the copy has failed halfway.

Figure 1:
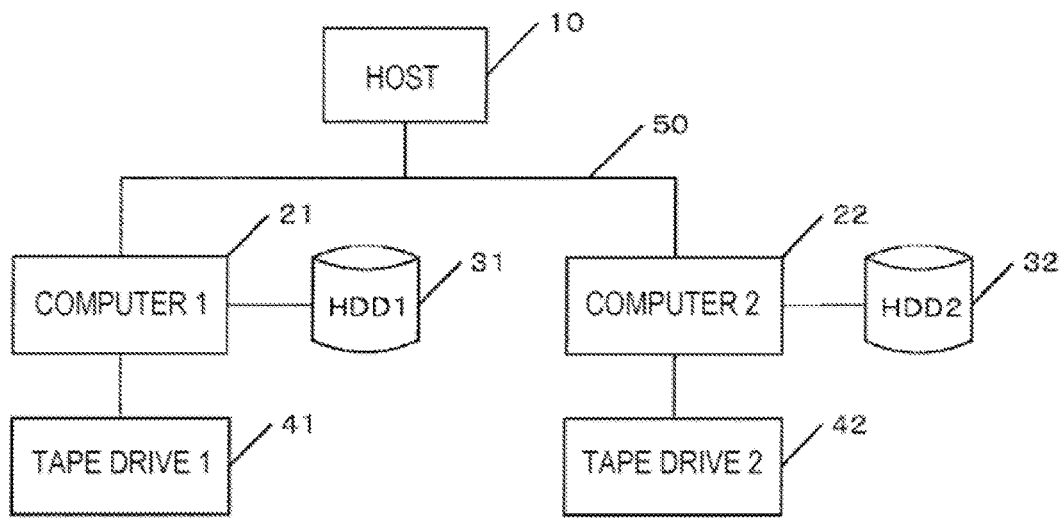
FIG. 1 is a diagram illustrating a configuration example of a system, according to an embodiment of the present invention.

Embodiments of the present invention will be described with reference to the drawings. It should be noted that, in the following embodiments, although copying a virtual tape volume on the assumption of a tape drive will be described as an example of copying a virtual sequential access volume, embodiments of the present invention are also applicable to other cases, such as copying the virtual sequential access volume on the assumption of another sequential access device. FIG. 1 illustrates a configuration example of a system in which a method is performed, according to an embodiment of the present invention. The configuration example of FIG. 1 includes two computers 21 and 22 that communicably connect to a host 10 through a network 50. The two computers 21 and 22 correspond to a minimum configuration, and three or more multiple computers may be included. The host 10 may communicably connect to at least one computer, and moreover, two or more arbitrary number of hosts may be included.

The respective computers include HDDs 31 and 32 as storage devices. The HDDs 31 and 32 may be provided in a manner either internal or external to the computers. The storage devices may be provided in a manner to be shared by the two computers 21 and 22. The storage devices are not limited to the HDDs, and other storage devices, such as semiconductor memories, may also be used. In the configuration of FIG. 1, the respective computers further communicably connect to tape drives 41 and 42. Instead of providing the tape drive in each computer, at least one or more tape drives may be provided in a manner that can be shared among the multiple computers. It should be noted that, instead of the tape drives, or along with the tape drives, for example, other sequential access devices, such as optical/magneto-optical disk drives, may be used. Moreover, configurations can be employed that do not include sequential access devices such as tape drives.

The computers 21 and 22 implement software (virtualization engines) for causing the computers to function as virtual tape servers for executing methods of the present invention, and copying data in the virtual tape volume is performed through execution of the software. In other words, the computers 21 and 22 function as the virtual tape servers through the execution of the software (virtualization engines).

Figure 2:
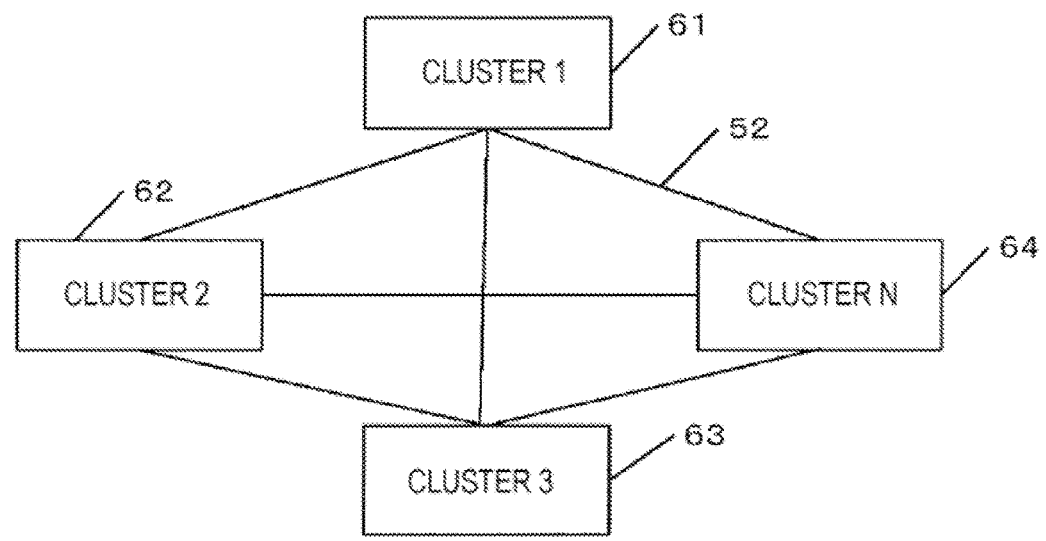
FIG. 2 is a diagram illustrating another configuration example of a system, according to an embodiment of the present invention.

FIG. 2 illustrates another configuration example of a system in which a method of an embodiment of the present invention is performed. FIG. 2 assumes copying data among multiple clusters (1 to N) 61 to 64 that are communicably connected through the network 52. Each cluster includes a computer, as illustrated in FIG. 1, which is connect to an HDD and a tape drive. The cluster can include at least one or more computers (servers). Each cluster can also communicably connect to any other cluster through the network 52. Each cluster, and more precisely, the computers within each cluster, can function as the virtual tape servers through the execution of the software (virtualization engines), similar to the case of FIG. 1.

Figure 3:
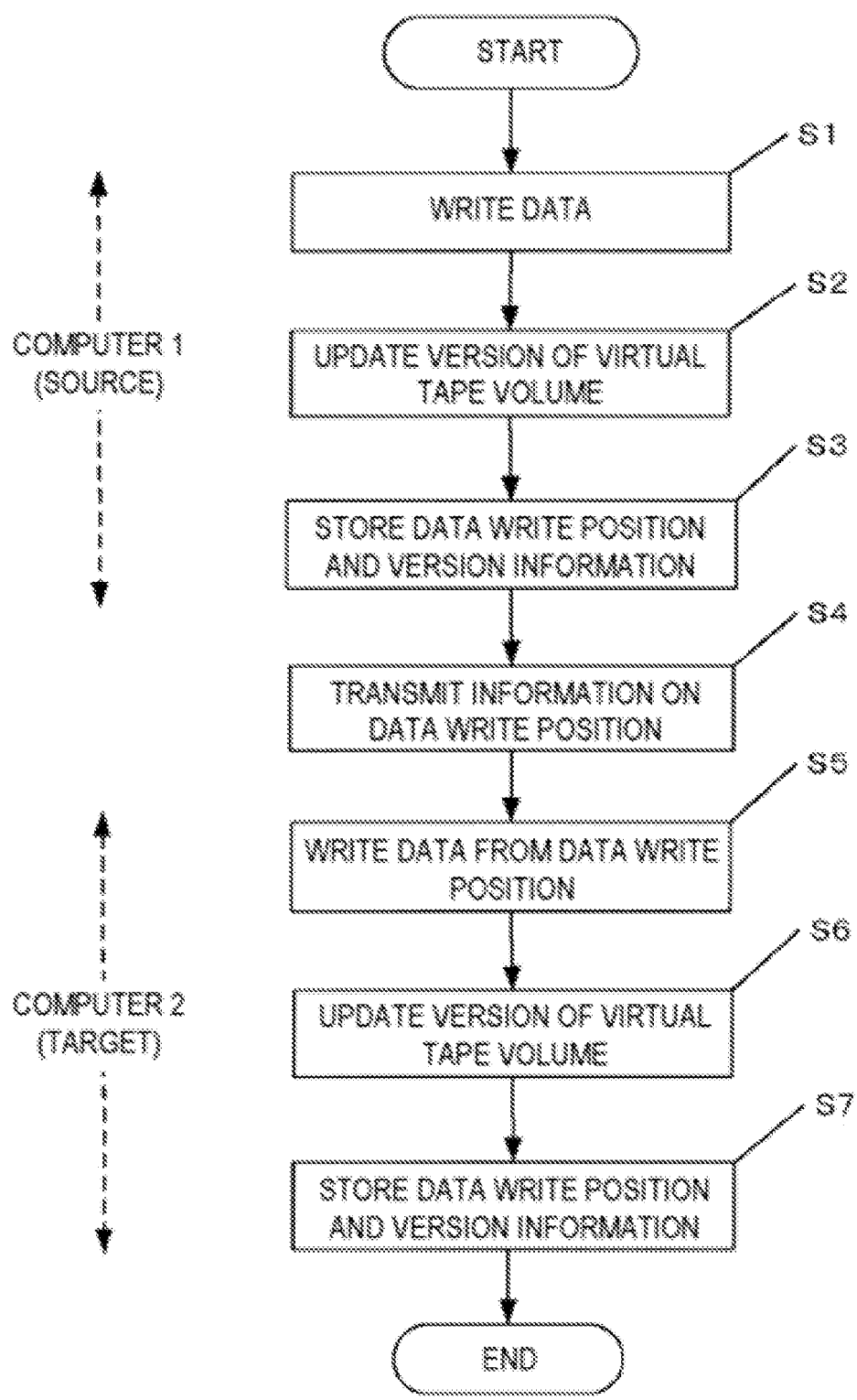
FIG. 3 is a diagram illustrating a method flow, according to an embodiment of the present invention.

FIG. 3 is a diagram illustrating a method flow of an embodiment of the present invention. The flow of FIG. 3 is described based on the configuration of FIG. 1. In this case, operations Si to S3 in the former half are executed at a computer 1, and operations S5 to S7 in the latter half are executed at a computer 2. It should be noted that, also in a configuration other than the configuration of FIG. 1, a similar flow is executed between a source computer and another target computer, which are arbitrarily selected. For example, in the configuration of FIG. 2, each operation can be similarly executed between a source cluster and another target cluster.

In operation S1, the computer 1 writes first data in a first virtual tape volume received from the host 10, into a first virtual tape volume stored in an HDD 1. In operation S2, the computer 1 updates version information on the first virtual tape volume stored in the HDD 1. This update of the version information is described in greater detail below. It should be noted that, in terms of order, the update of the version information in operation S2 may also be performed before the data is actually written in operation S1. In operation S3, the computer 1 stores the updated version information and information on a write start position of the first data, into the HDD 1. This information on the write start position will be described in detail later. In operation S4, the host 10 transmits the information on the write start position of the first data to the computer 2.

In operation S5, the computer 2 writes the first data received from the computer 1, into a first virtual tape volume stored in an HDD 2, from the received write start position of the first data in the first virtual tape volume. In operation S6, the computer 2 updates version information on the first virtual tape volume stored in the HDD 2. This update of the version information is described in greater detail below. In operation S7, the computer 2 stores the updated version information and the received information on the write start position of the first data, into the HDD 2.

In this way, according to the method flow of this embodiment, the version information on the virtual tape volume and the information on the write start position of updated (difference) data (first data) in the virtual tape volume are utilized (sequentially stored and transmitted to be shared). Thereby, selection of a copy source computer (source) and identification of the difference data to be written can be easily and quickly performed.

Figure 4:
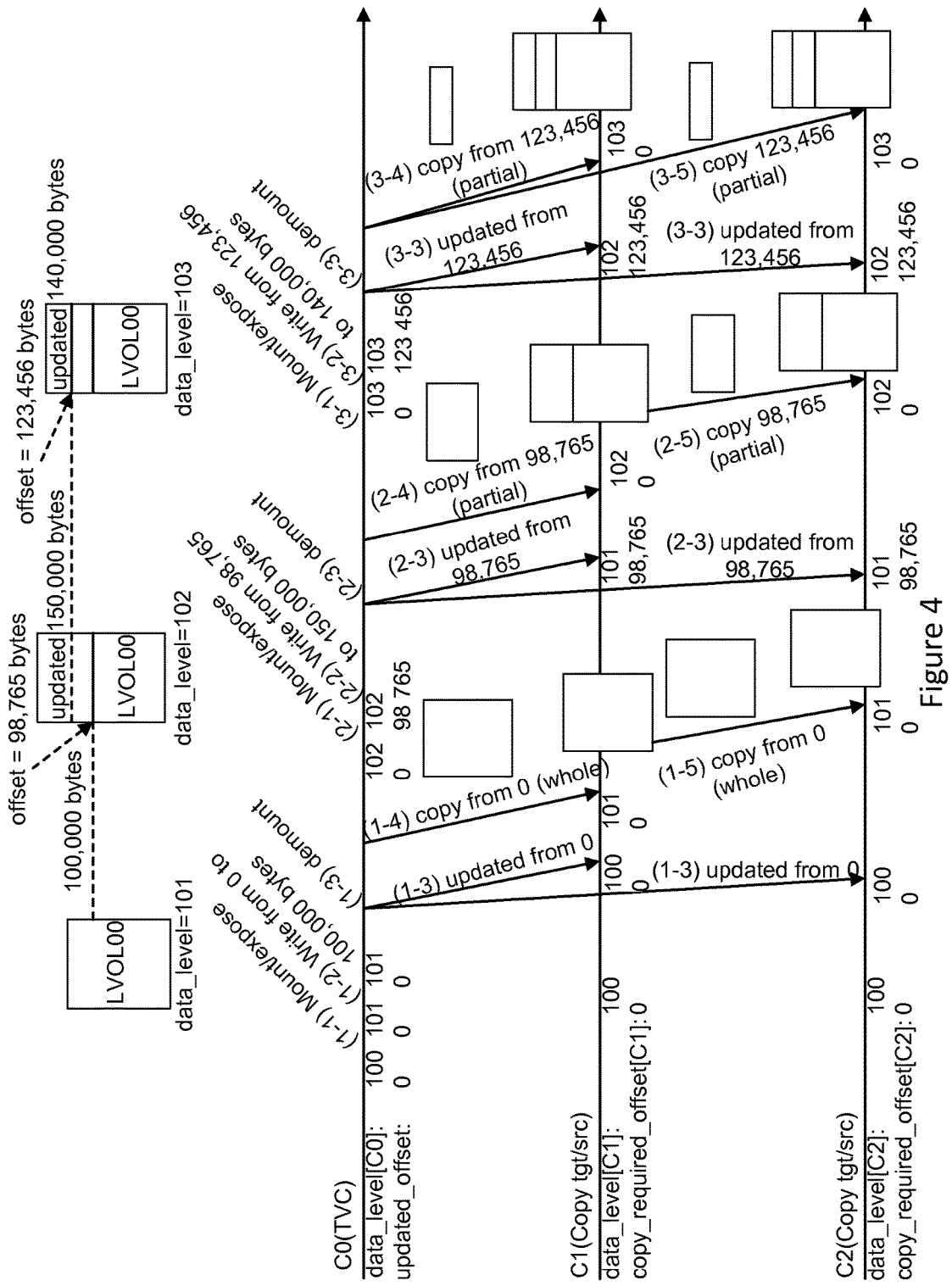
FIG. 4 is a diagram illustrating a data flow, according to an embodiment of the present invention.
Figure 5:
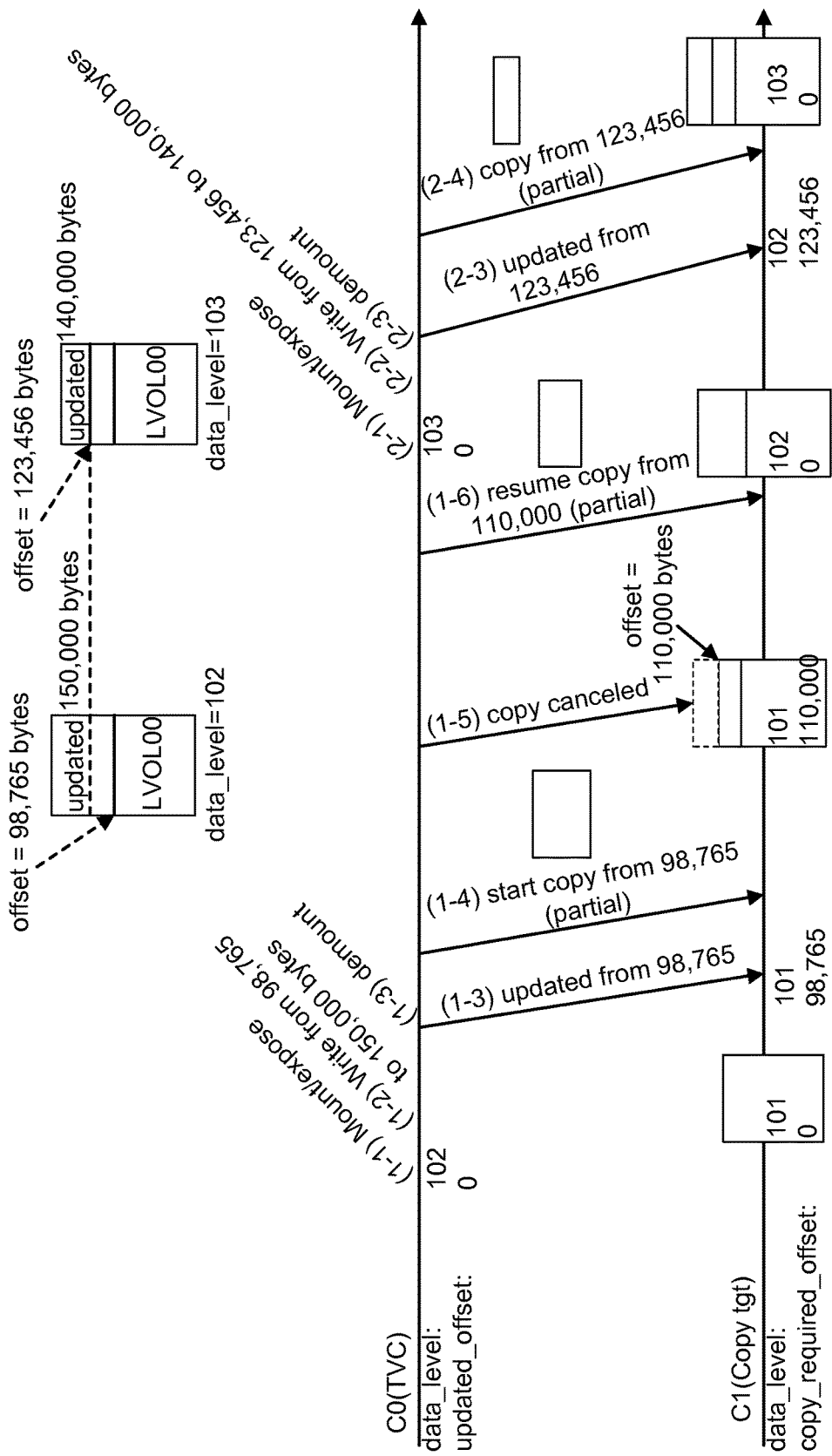
FIG. 5 is a diagram illustrating another data flow, according to an embodiment of the present invention.

Next, with reference to FIGS. 4 and 5, data flows of an embodiment of the present invention based on the flow of FIG. 3 will be described in detail. FIGS. 4 and 5 assume copying the data among the clusters illustrated in FIG. 2. FIG. 4 is a flow of normal data copy, while FIG. 5 illustrates a flow in the case where the data copy has been canceled (interrupted) halfway. The case of FIG. 4 will be described first.

In FIG. 4, the virtual tape volume is denoted as "LVOL00." It is assumed that LVOL00 is defined (inserted) at the leftmost position on each temporal axis shown as a horizontal arrow, and that "data_level" indicating a data update status (version information) starts from 100. "copy_required_offset" is managed as a part of the version information similarly to data_level, and is used as information indicating from which offset the data is required to be copied. The default value of copy_required_offset is set to 0.

TVC (Tape Volume Cache) denotes the cluster into which the host has written the data, and is assumed to have been C0 in this example. After the host has mounted LVOL00, LVOL00 is copied to clusters C1 and C2, which are copy targets "Copy tgt". Moreover, update_offset shown on C0 is a value indicating from which offset the writing from the host has been updated.

A plurality of operations will now be described with reference to the data flows shown in FIG. 4.

(1-1): The host mounts LVOL00 to start new write of the data in LVOL00. When the first write comes from the host after the mounting, a process referred to as "expose" is performed, and data_level on TVC increases by one according to this expose process. Here, data_level of LVOL00 on C0 changes from 100 to 101.

(1-2): The host writes the data. Here, it is assumed that 100,000 bytes have been written from the beginning of LVOL00.

(1-3): The host demounts LVOL00. As a part of a demount process, C1 and C2 are informed from which offset the data has been rewritten. In this case, since the data has been written from offset 0 byte, copy_required_offset remains as 0 on C1 and C2.

(1-4): Since the host completes the write, necessary data is copied to C1 . In this case, because of copy_required_offset=0 on C1, the necessary data becomes the entire LVOL00 (all from offset 0). After the copy is completed, data_level of LVOL00 on C1 changes to 101.

(1-5): It is assumed that C1 has been selected as a copy source "Copy src" for the copy for C2 as the copy target "Copy tgt". It should be noted that the method of this embodiment of the present invention has a logic for selecting the copy source "Copy src" depending on circumstances at each time. In this case, because of copy_required_offset=0 on C2, the necessary data becomes the entire LVOL00. After the copy is completed, data_level of LVOL00 on C2 changes to 101.

(2-1): The host mounts LVOL00 again to start the new write of the data in LVOL00. data_level on TVC (C0) increases to 102 according to the expose process.

(2-2): The host writes the data. Here, it is assumed that the data has been written from offset 98,765 bytes to offset 150,000 bytes in LVOL00. In this case, the data from 98,765 bytes to 100,000 bytes is overwritten.

(2-3): The host demounts LVOL00. As a part of this demount process, C1 and C2 are informed from which offset the data has been rewritten. In this case, since the data has been written from offset 98,765 bytes, copy_required_offset becomes 98,765 on C1 and C2.

(2-4): Since the host completes the write, the necessary data is copied to C1. In this case, because of copy_required_offset=98,765 on C1, the necessary data becomes all the data from 98,765 bytes in LVOL00. After the copy is completed, data_level of LVOL00 on C1 changes to 102.

(2-5): It is assumed that C1 has been selected again as the copy source "Copy src" for the copy for C2 as the copy target "Copy tgt". In this case, because of copy_required_offset=98,765 on C2, the necessary data becomes all the data from 98,765 bytes in LVOL00. After the copy is completed, data_level of LVOL00 on C2 changes to 102.

(3-1): The host mounts LVOL00 again to start the new write of the data in LVOL00. data_level on TVC (C0) increases to 103 according to the expose process.

(3-2): The host writes the data. Here, it is assumed that the data has been written from offset 123,456 bytes to offset 140,000 bytes in LVOL00. The data from 123,456 bytes to 140,000 bytes is overwritten, and the data from 140,001 bytes to 150,000 bytes is truncated.

(3-3): The host demounts LVOL00. As a part of the demount process, C1 and C2 are informed from which offset the data has been rewritten. In this case, since the data has been written from offset 123,456 bytes, copy_required_offset becomes 123,456 on C1 and C2.

(3-4): Since the host completes the write, the necessary data is copied to C1 . In this case, because of copy_required_offset=123,456 on C1 , the necessary data becomes all the data from 123,456 bytes in LVOL00. After the copy is completed, data_level of LVOL00 on C1 changes to 103.

(3-5): It is assumed that C0 has been selected this time as the copy source "Copy src" for the copy for C2 as the copy target "Copy tgt". In this case, because of copy_required_offset=123,456 on C2, the necessary data becomes all the data from 123,456 bytes in LVOL00. After the copy is completed, data_level of LVOL00 on C2 changes to 103.

Accordingly, in the method flow illustrated in FIG. 4, a copy process (Incremental replication) for the virtual tape volume can detect and identify the difference in a very short time, in comparison with difference detection (for example, data comparison using Block Allocation Bit map or Hash) in conventional random access file systems.

The case of FIG. 5 will be described next.

Here, the virtual tape volume is denoted as "LVOL00." It is assumed that LVOL00 with data_level=101 already exists on C1 at the leftmost position on the temporal axis shown as the horizontal arrow (it is assumed to have already been copied). Similarly to the case of FIG. 4, TVC (Tape Volume Cache) denotes the cluster into which the host has written the data, and is assumed to have been C0 (Cluster 0) in this example. After the host has demounted LVOL00, LVOL00 is copied (replicated) to C1 (Cluster 1) that is the copy target "Copy tgt".

(1-1): The host mounts LVOL00. It is assumed that LVOL00 has already existed and the data size has been 100,000 bytes. Then, it is found out that the write occurs, and the expose process is performed. data_level on TVC increases by one according to this expose process. Here, data_level of LVOL00 on C0 changes from 101 to 102.

(1-2): The host writes the data. Here, it is assumed that the data has been written from offset 98,765 bytes to offset 150,000 bytes in LVOL00. The data from 98,765 bytes to 100,000 bytes is overwritten.

(1-3): The host demounts LVOL00. C0 (TVC) notifies another cluster (here, C1 ) of updated offset 98,765.

(1-4): Since the host completes the write, C1 requests C0 to provide subsequent data from 98,765 bytes. C1 starts to copy the subsequent data from 98,765 bytes, which has been received from C0.

(1-5): Here, it is assumed that the copy has been canceled for some reason during the copy (e.g., the copy may have failed halfway due to a network error or the like). Since 110,000 bytes of the data has been completely copied, copy_required_offset is changed to 110,000 on C1.

(1-6): It is assumed that the copy process is restarted. Since 110,000 bytes of the data has been completely copied, C1 requests the data from 110,000 bytes. C1 copies the received data, and completes the entire copy. data_level becomes 102 on C1.

(2-1): Next, the host mounts LVOL00 again, and it is found that the data is updated. data_level on TVC (C0) increases to 103 according to the expose process.

(2-2): The host writes the data. Here, it is assumed that the data has been written from offset 123,456 bytes to offset 140,000 bytes in LVOL00. The data from 123,456 bytes to 140,000 bytes is overwritten, and the data from 140,001 bytes to 150,000 bytes is truncated (the data is lost).

(2-3): The host demounts LVOL00. C0 (TVC) notifies another cluster (here, C1 ) of the updated offset 123,456.

(2-4): Since the host completes the write, C1 requests C0 to provide subsequent data from 123,456 bytes. C1 starts to copy the subsequent data from 123,456 bytes, which has been received from C0. After the copy is completed, data_level of LVOL00 on C1 changes to 103.

Embodiments of the present invention described above provide several operational advantages. For example, even in retransmission in the case where the copy has not been completed due to some cause during file transfer, tracking of the difference data is enabled. In another example, the described method does not depend on its configuration and a copy mode. In other words, in N-to-M bidirectional copy, the described method is enabled in different copy modes (either synchronous copy (RUN Copy) or asynchronous copy (Deferred Copy)). Here, the synchronous copy (RUN Copy) refers to a copy mode of completing the copy at the time of demounting, and the asynchronous copy (Deferred Copy) refers to a copy mode of performing the copy at an appropriate timing after the demounting. In yet another example, Data Level keeps history of previous update_offset for N generations in TVC, and, thereby, previous data differences for N generations can be copied to the data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The embodiments of the present invention have been described with reference to the drawings. The present invention, however, is not limited to these embodiments. Furthermore, the present invention can be practiced in aspects to which various improvements, modifications or variations have been added based on the knowledge of those skilled in the art, within a range not deviating from the spirit of the present invention.

What is claimed is:

1. A method of copying data in a virtual sequential access volume, comprising:
   a first computer receiving, from a host, first data and a byte write start position, wherein the first data comprises a set of bytes, within the virtual sequential access volume, spanning from the byte write start position to an ending byte position corresponding to an end of the virtual sequential access volume;
   the first computer writing the first data, beginning from the byte write start position, into a copy of the first virtual sequential access volume and storing the first copy in a first storage device;
   the first computer updating first version information, corresponding to the first copy, and storing in the first storage device the updated first version information and first information on the byte write start position;
   a second and a third computer receiving, in response to a demount operation of the host associated with the first computer completing writing the first data into the first copy, the byte write start position;
   in response to the second computer receiving the byte write start position, the second computer receiving the first data from the first computer, writing the first data, beginning from the byte write position, into a second copy of the virtual sequential access volume, and storing the second copy in a second storage device;
   the second computer updating second version information, corresponding to the second copy, and storing, in the second storage device, the updated second version information and second information on the byte write start position;
   in response to the third computer receiving the write start position, the third computer receiving the first data from one of the first computer and the second computer, writing the first data, beginning from the byte write start position, into a third copy of the virtual sequential access volume, and storing the third copy in a third storage device; and
   the third computer updating a third version information, corresponding to the third copy, and storing, in the third storage device, the updated third version information and third information on the byte write start position;
   wherein the method further comprises the second computer responding to an interruption of the second computer writing the first data into the second copy by:
   storing, in the second storage device, an interrupted byte position corresponding to a byte position, within the second copy, at which the writing the first data into the second copy was interrupted;
   requesting the first computer to transmit, to the second computer, second data corresponding to data, within the first data, spanning from the stored interrupted byte position to the ending byte position; and
   writing the second data, beginning from the stored interrupted byte position, into the second copy.

2. The method according to claim 1, wherein the first computer comprises a Tape Volume Cache.

3. The method according to claim 1, further comprising the third computer responding to an interruption of the third computer writing the first data into the third copy by:
   storing, in the third storage device, an interrupted byte position corresponding to a byte position, within the third copy, at which the writing the first data into the third copy was interrupted;
   requesting at least one of the first computer and the second computer to transmit, to the third computer, second data corresponding to data, within the first data, spanning from the stored interrupted byte position stored to the ending byte position; and
   writing the second data, beginning from the stored interrupted byte position, into the third copy.

4. The method according to claim 1, wherein the method further comprises one or more of the operations of:
   the first computer copying data included in the first copy into a first sequential storage device;
   the second computer copying data included in the second copy into a second sequential storage device; and
   the third computer copying data included in the third copy into a third sequential storage device.

5. The method according to claim 4, wherein one or more of the first sequential storage device, the second sequential storage device, and the third sequence storage device comprises a tape drive.

6. A system for copying data in a virtual sequential access volume, the system comprising:
   a host;
   a first computer, among a plurality of interconnected computers, communicatively coupled to the host and communicatively coupled to a first storage device;
   a second computer, among the plurality of interconnected computers, communicatively coupled to the first computer and communicatively coupled to a second storage device;
   a third computer, among the plurality of interconnected computers, communicatively coupled to at least one of first computer and the second computer, and communicatively coupled to a third storage device;
   wherein the host is configured to write, to the first computer, first data comprising a set of bytes, within the virtual sequential access volume, spanning from a byte write start position to a byte position corresponding an end of the virtual sequential access volume;

wherein the first computer is configured to receive, from the host, the first data and the byte write start position, to write the first data, beginning from the byte write start position, into a first copy of the virtual sequential access volume, and to store the first copy in the first storage device;

wherein the first computer is further configured to, in association with writing the first data into the first copy, update first version information, corresponding to the first copy, and store the updated first version information and information on the byte write start position in the first storage device;

wherein the host is further configured to perform a demount operation in association with the first computer completing writing the first data into the first copy;

wherein the second computer and the third computer are configured to receive the byte write start position in response to the host performing the demount operation;

wherein the second computer is further configured to respond to receiving the byte write start position by receiving the first data from the first computer, writing the first data, beginning from the byte write start position, into a second copy of the virtual sequential access volume, and storing the second copy in the second storage device;

wherein the second computer is further configured to, in association with writing the first data into the second copy, update second version information, corresponding to the second copy, and store the updated second version information and information on the byte write start position in the second storage device;

wherein the third computer is further configured to respond to receiving the byte write start position by receiving the first data from one of the first computer and the second computer, writing the first data, beginning from the byte write start position, into a third copy of the virtual sequential access volume, and storing the third copy in the third storage device; and wherein the third computer is further configured to, in association with writing the first data into the third copy, update third version information, corresponding to the first copy, and store the updated third version information and information on the byte write start position in the third storage device;

wherein the second computer is further configured to respond to an interruption of the writing the first data into the second copy by:

storing, in the second storage device, an interrupted byte position corresponding to a byte position, within the second copy, at which the writing the first data into the second copy was interrupted;

requesting the first computer to transmit, to the second computer, second data corresponding to data, within the first data, spanning from the stored interrupted byte position to the ending byte position; and writing the second data, beginning from the stored interrupted byte position, into the second copy.

7. The system according to claim 6, wherein the first computer comprises a Tape Volume Cache.

8. The system according to claim 6, wherein the third computer is further configured to respond to an interruption of the writing the first data into the third copy by:

storing, in the third storage device, an interrupted byte position corresponding to a byte position, within the third copy, at which the writing the first data into the third copy was interrupted;

requesting at least one of the first computer and the second computer to transmit, to the third computer, second data corresponding to data, within the first data, spanning from the stored interrupted byte position to the ending byte position; and writing the second data, beginning from the stored interrupted byte position, into the third copy.

9. The system according to claim 6, wherein one or more of the first computer, the second computer, and the third computer are further configured to copy data, included in the respective first, second and third copies of the virtual sequential access volume, to a sequential storage device.

10. The system according to claim 9, wherein the sequential storage device comprises a tape drive.

11. A computer program product for copying data in a virtual sequential access volume, the computer program product comprising program instructions stored on one or more computer readable storage media, the program instructions comprising instructions executable by at least one processor to cause:

a first computer to receive, from a host, first data and a byte write start position, wherein the first data comprises a set of bytes, within the virtual sequential access volume, spanning from the byte write start position to an ending byte position corresponding to an end of the virtual sequential access volume;

the first computer to write the first data, beginning from the byte write start position, into a first copy of the virtual sequential access volume and store the first copy in a first storage device;

the first computer to update, in association with writing the first data into the first copy, first version information, corresponding to the first copy, and store the updated first version information and information on the byte write start position in the first storage device;

a second and a third computer to receive the byte write start position in response to a demount operation of the host associated with the first computer completing the writing the first data into the first copy;

the second computer, in response to receiving the byte write start position, to receive the first data and to write the first data, beginning from the byte write position, into a second copy of the virtual sequential access volume and store the second copy in a second storage;

the second computer to update, in association with writing the first data into the second copy, second version information, corresponding to the second copy, and store the updated second version information and information on the byte write start position in the second storage device;

the third computer, in response to receiving the byte write start position, receive the first data and write the first data, beginning from the byte write start position, into a third copy of the virtual sequential access volume, and store the third copy in a third storage device; and the third computer to update, in association with writing the first data into the third copy, third version information, corresponding to the third copy, and store the updated third version information and information on the byte write start position in the third storage device;

wherein the computer program product further comprises instructions executable by the at least one processor to cause the second computer, in response to an interruption of the writing the first data into the second copy, to:

store, in the second storage device, an interrupted byte position corresponding to a byte position, within the second copy, at which the writing the first data into the second copy was interrupted;

request transmission of second data corresponding to data, within the first data, spanning from the stored interrupted byte position to the ending byte position; and write the second data, beginning from the stored interrupted byte position, into the second copy.

12. The computer program product of claim 11, wherein one or more processors among the at least one processor is included in a Tape Volume Cache.

13. The computer program product according to claim 11, further comprising instructions executable by the at least one processor to cause the third computer, in response to an interruption of the writing the first data into the third copy, to:

store, in the third storage device, an interrupted byte position corresponding to a byte position, within the third copy, at which the writing the first data into the third copy was interrupted;

request transmission of second data corresponding to data, within the first data, spanning from the stored interrupted byte position to the ending byte position; and write the second data, beginning from the stored interrupted byte position, into the third copy.

14. The computer program product according to claim 11, further comprising instructions executable by the at least one processor to:

copy data included in the first copy, stored in the first storage device, to a first sequential storage device;

copy data included in the second copy, stored in the second storage device, to a second sequential storage device; and copy data included in the third copy stored in the third storage device, into a third sequential storage device.

15. The computer program product according to claim 14, wherein at least one of the first sequential storage device, the second sequential storage device, and the third sequential storage devices comprises a tape drive.

16. The method according to claim 1, wherein at least one of the updating the first version information, the updating the second version information, and the updating the third version information comprises incrementing a data level.

17. The computer program according to claim 11, wherein the first computer, the second computer, and the third computer are included among a plurality of interconnected computers;

wherein the first computer is communicatively connected to the host and to the second computer; and wherein the third computer is communicatively coupled to the second computer and, optionally, to the first computer.

* * * * *